(12) United States Patent
Cutrì et al.

(10) Patent No.: US 11,827,303 B2
(45) Date of Patent: Nov. 28, 2023

(54) EASY-INSTALLATION TOP BOX FOR RIDABLE SADDLE VEHICLE

(71) Applicant: PIAGGIO & C. S.P.A., Pontedera (IT)

(72) Inventors: Niccolò Cutrì, Pontedera (IT); Antonio Di Candia, Pontedera (IT); Roberto Mengoni, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 508 days.

(21) Appl. No.: 17/266,305

(22) PCT Filed: Sep. 12, 2019

(86) PCT No.: PCT/IB2019/057688
§ 371 (c)(1),
(2) Date: Feb. 5, 2021

(87) PCT Pub. No.: WO2020/053797
PCT Pub. Date: Mar. 19, 2020

(65) Prior Publication Data
US 2021/0300495 A1  Sep. 30, 2021

(30) Foreign Application Priority Data
Sep. 13, 2018  (IT) .................. 102018000008554

(51) Int. Cl.
*B62J 9/24* (2020.01)
*B62J 9/27* (2020.01)

(52) U.S. Cl.
CPC .. *B62J 9/24* (2020.02); *B62J 9/27* (2020.02)

(58) Field of Classification Search
CPC ................... B62J 9/23; B62J 9/24; B62J 9/27
See application file for complete search history.

(56) References Cited

U.S. PATENT DOCUMENTS

| | | | |
|---|---|---|---|
| 9,375,056 B1 | 6/2016 | Risley | |
| 10,858,056 B2 * | 12/2020 | Mann | ........................ B62J 25/06 |
| 11,731,722 B2 * | 8/2023 | Louden | ...................... B62J 9/24 |
| | | | 224/412 |

FOREIGN PATENT DOCUMENTS

| | | |
|---|---|---|
| DE | 10014291 A1 | 9/2001 |
| DE | 102016012905 A1 | 1/2018 |

(Continued)

OTHER PUBLICATIONS

International Search Report for corresponding application PCT/IB2019/057688 filed Sep. 12, 2019; dated Dec. 6, 2019.

(Continued)

*Primary Examiner* — Kevin Hurley
(74) *Attorney, Agent, or Firm* — CANTOR COLBURN LLP

(57) ABSTRACT

A top box for a ridable saddle vehicle, including a bottom and a fixing assembly provided on the bottom and configured to fix the top box to a luggage carrier which has at least one mounting portion, where the fixing assembly is configured to take a release configuration, in which it allows coupling/decoupling the top box to/from the luggage carrier, and a fixing configuration, in which it allows fixing the top box to the luggage carrier, where the fixing assembly includes at least one fixing portion shaped so as to achieve a shape coupling with the mounting portion when the fixing assembly takes the fixing configuration.

11 Claims, 5 Drawing Sheets

(56) References Cited

FOREIGN PATENT DOCUMENTS

GB          2175039 A    11/1986
WO    2015189854 A1   12/2015

OTHER PUBLICATIONS

Written Opinion of the International Searching Authority for corresponding application PCT/IB2019/057688 filed Sep. 12, 2019; dated Dec. 6, 2019.

* cited by examiner

EASY-INSTALLATION TOP BOX FOR RIDABLE SADDLE VEHICLE

TECHNICAL FIELD

The present disclosure relates in general to the sector of ridable saddle vehicles and, more specifically, relates to a top box for a ridable saddle vehicle.

BACKGROUND

On some types of ridable saddle vehicles, in particular but not exclusively scooters with two or more wheels, top boxes, which are normally either applied to or integrated in the rear part of the vehicle, are commonly used. Known top boxes typically comprise a base and a cover hinged to the base. A storage compartment is defined between the base and the cover, which can be used to transport objects while the vehicle is moving or in which the crash helmet can be stored when the vehicle is not in use.

It is known that top boxes are attached to tubular truss structure luggage carriers or to bars which are, in turn, mounted on the vehicle. Such bar luggage carriers are typically formed by a plurality of bars, normally tubular metal bars, which are mutually interconnected. Fixing systems are also known for fixing a top box to a bar luggage carrier, which have the drawback of making the installation of the top box relatively complicated. Indeed, such fixing systems require mounting brackets to be fixed in advance to a bar of the luggage carrier, e.g. by means of a plurality of screws. The top box is then fixed to the mounting brackets by means of further screws which pass through the bottom of the top box and are inserted into corresponding nut screws provided in the mounting brackets.

BRIEF SUMMARY

The disclosure provides a top box for a ridable saddle vehicle which allows solving or at least partially overcoming the drawbacks discussed above.

In one embodiment, the disclosure provides a top box for a ridable saddle vehicle which allows the top box to be fixed to a bar luggage carrier more easily and quickly than the fixing systems of the prior art discussed above, while ensuring reliability and safety of the fixing.

BRIEF DESCRIPTION OF THE DRAWINGS

The disclosure will be better understood from the following detailed description of the embodiments thereof, provided by way of not limiting example with reference to the accompanying drawings, in which.

DETAILED DESCRIPTION

Figure 1:
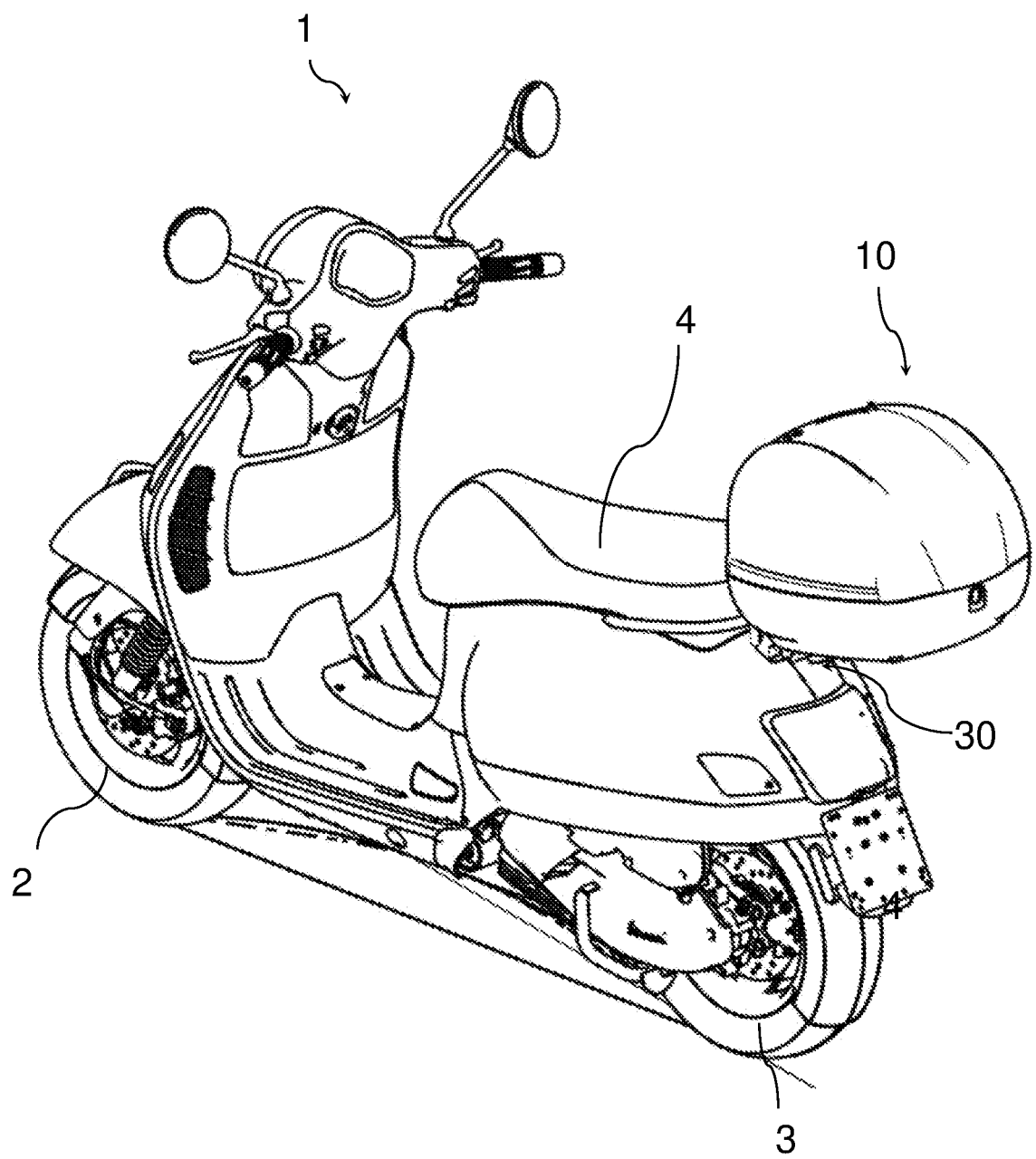
FIG. 1 is a perspective view of a ridable saddle vehicle with a top box according to a preferred embodiment fixed to a luggage carrier.

The following description of one or more embodiments of the disclosure refers to the accompanying drawings. The same reference numerals in the drawings identify identical or similar elements. The drawings are not necessarily in scale. Additionally, the following detailed description must not be considered limiting of the disclosure itself. The scope of the disclosure is defined by the appended claims. The technical details, structures or features of the solutions described below may be combined in any manner unless it is expressly stated that some features or solutions are alternative to one another or it is apparent from the following description that two or more features or embodiments are mutually incompatible.

Hereinafter, in the following description, unless otherwise stated, the terms "upper", "lower", "vertical", "horizontal" or similar terms are to be understood as referring to vehicle 1 in a normal condition of use, in which, in particular, the luggage carrier 30 with the top box 10 fitted thereto is attached to the vehicle 1. The vehicle 1, the top box 10 and the luggage carrier 30 will be described in more detail below in this description.

With initial reference to FIG. 1, the figure shows an embodiment of a ridable saddle vehicle 1. In particular, the vehicle 1 is a motorcycle 1 and more specifically a scooter 1. The example shown in the figures in particular shows an embodiment of a motorcycle 1, which, without because of this introducing any limitation, comprises a motorcycle with two wheels 2, 3, and comprising a front wheel 2 and a rear wheel 3. It is worth noting that for the purposes of the present description, the term "motorcycle" means any type of vehicle 1 comprising:

a supporting structure;
at least two wheels 2, 3 either directly or indirectly constrained to the supporting structure;
a traction engine, e.g. thermal or electric or hybrid, constrained to the supporting structure and operatively connected to at least one of the two wheels 2, 3;
a ridable saddle 4 fixed to the supporting structure.

It is worth noting that the teachings in the present description are generally applicable to any ridable saddle vehicle with two, three, four or more wheels to which a top box can be attached, such as, but not limited to, motorcycles, mopeds, scooters, ATVs (All Terrain Vehicles), etc.

A luggage carrier 30 is mounted onto the motorcycle 1, to which a top box 10 is attached, in turn. The luggage carrier 30 is preferably fixed to the motorcycle 30 in a removable manner. In an alternative embodiment, not shown, it can be integrated into motorcycle 1. The top box 10 is fixed in a removable manner to the luggage carrier 30.

Figure 3:
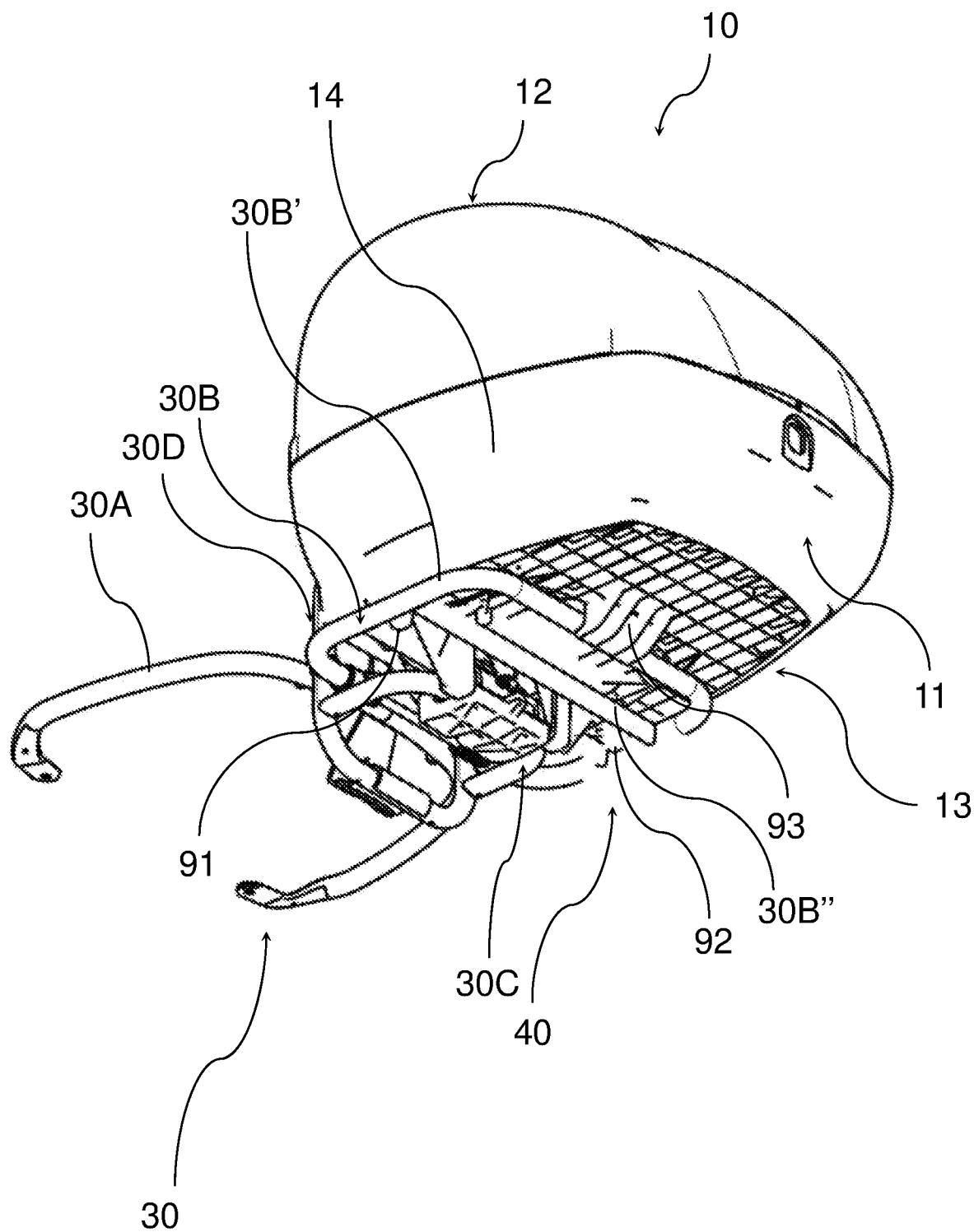
FIG. 3 is a perspective view from below which shows the top box in FIG. 1 fixed to the luggage carrier in FIG. 1 by means of a fixing assembly.

Preferably, as shown, for example, in FIG. 3, the luggage carrier 30 has a tubular truss frame, which is preferably made of metal or metal alloy. According to a preferred embodiment, the luggage carrier 30 comprises at least one mounting part 30A configured to fix the luggage carrier 30 to the motorcycle 1, at least a first shelf 30B adapted to support the top box 10 and a supporting part 30D to which the mounting part 30A and the first shelf 30B are connected, respectively. In the example, the mounting part 30A, by way of non-limiting example, a tubular, generally "C"-shaped part. Preferably, the supporting part 30D extends vertically with respect to the plane of the saddle 4, while the mounting part 30A and the first bracket 30B extend horizontally, essentially parallel to the plane of the saddle 4.

According to an embodiment, the first shelf 30B comprises a tubular frame 30B' to which a number of straight tubular elements 30B" are connected, in the non-limiting example two straight tubular elements 30B", which extend within the tubular frame According to an embodiment, the luggage carrier 30 further comprises a second shelf 30C adapted to provide a support for the first shelf 30B. According to an embodiment, the first shelf 30B is a mobile shelf 30B or flap 30B which is hinged to the supporting part 30D. Preferably, the first shelf 30B is movable between a position in which it extends vertically and a position in which it extends horizontally so as to obtain a support for the top box 10.

Figure 4:
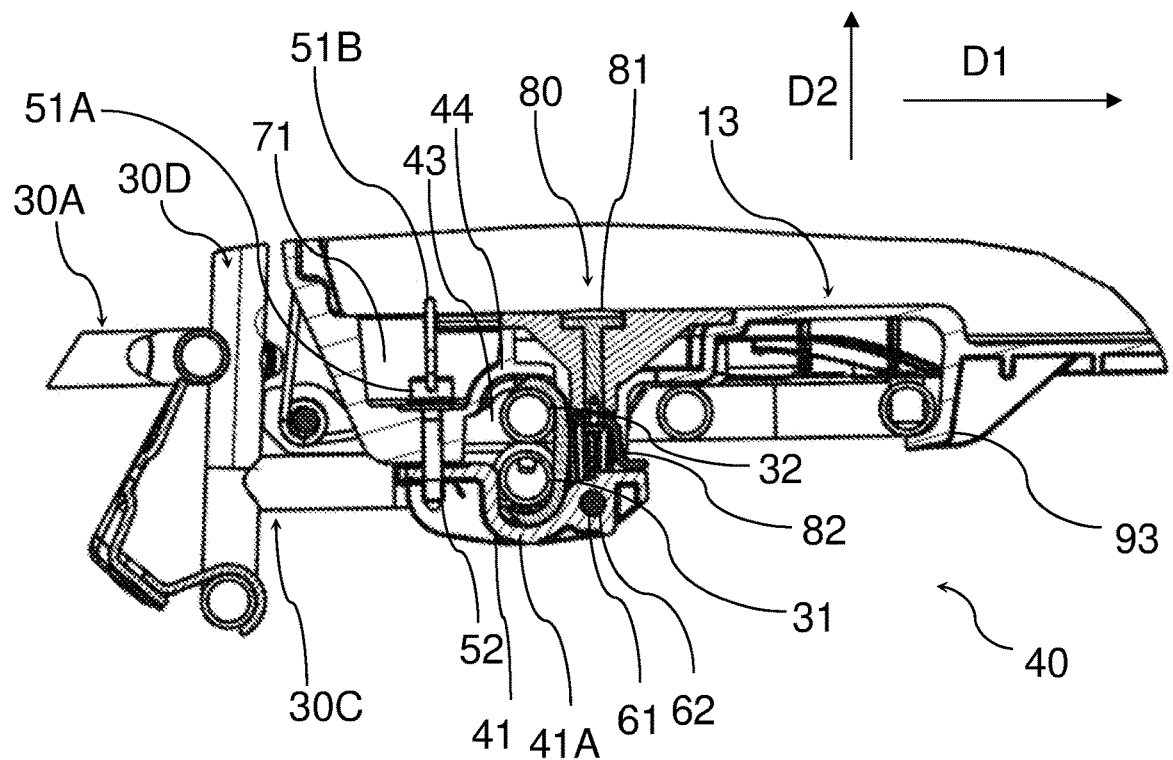
FIG. 4 is a side section plan view in which the luggage carrier and the top box in FIG. 1 are partially shown and in which, in particular, the fixing assembly in FIG. 3 is partially shown in a first configuration.
Figure 5:
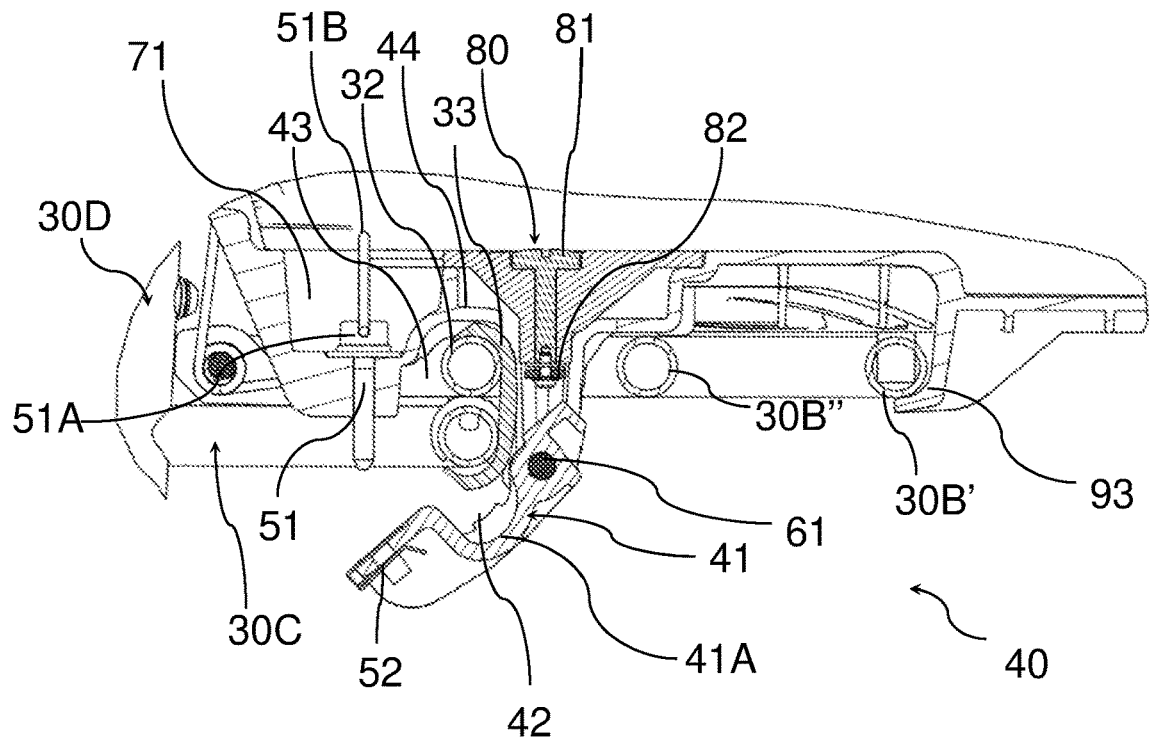
FIG. 5 is a side section plan view in which the luggage carrier and the top box in FIG. 1 are partially shown and in which the fixing assembly in FIG. 3 is partially shown in a second configuration.
Figure 6:
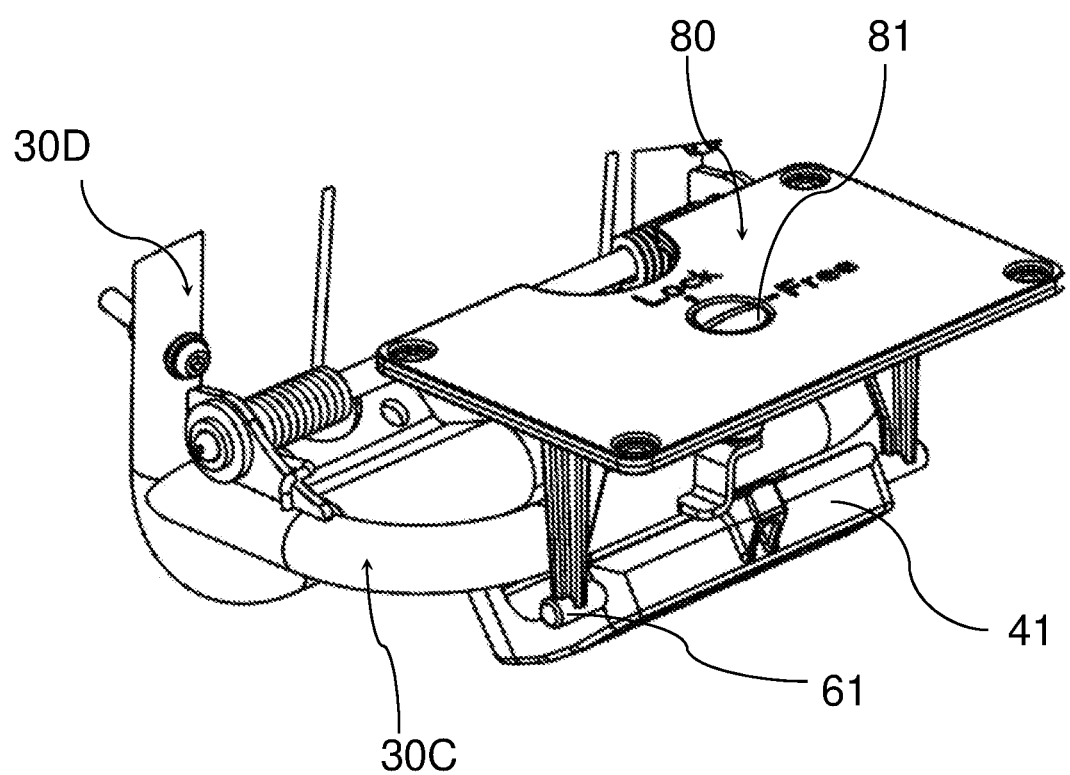
FIG. 6 is a perspective view in which the luggage carrier in FIG. 1 is partially shown and in which a detail of the fixing assembly in FIG. 3 is shown.

The top box 10 comprises a bottom 13 and a fixing assembly 40 provided on the bottom 13 configured to fix the top box 10 to the luggage carrier 30. According to an embodiment, the fixing assembly 40, in turn, comprises locking means 51, 52. In particular, the fixing assembly 40 is configured to take a release configuration (FIG. 5), in which it allows coupling/decoupling the top box 10 to/from said luggage carrier 30, and a fixing configuration (FIG. 4), in which it allows fixing the top box to said luggage carrier 30. The locking means 51, 52 are adapted to lock the fixing assembly 40 in the fixing configuration. In this regard, it is worth noting that FIG. 5 shows only one release configuration of a plurality of release configurations that the fixing assembly 40 can take. In general, for the purposes of this description, "release configuration" means a different configuration of the fixing assembly 40 from the fixing configuration in which the locking means 51, 52 lock the fixing assembly 40.

In detail, the fixing assembly 40 comprises at least one fixing portion 41A shaped so as to achieve a shape coupling with a mounting portion 31-33 of the luggage carrier 30, when the fixing assembly 40 takes the fixing configuration. It is worth noting that for the purposes of the present description "shape coupling" means an at least partial shape coupling. In other words, referring by way of non-limiting example to FIG. 4, according to an embodiment the fixing portion 41A is shaped or substantially counter-shaped with respect to a part of the mounting portion 31-33. In other words, the fixing portion 41A defines a seat in which the mounting portion 31-33 is coupled, e.g. a "U"-shaped seat, in which a tubular bar of the luggage carrier 30 is positioned. In the example, without because of this introducing any limitation, the fixing portion 41A is coupled to a part 31 of the second shelf 30C in the fixing configuration.

According to an embodiment, the mounting portion 31-33 comprises at least one part 32 of the first shelf 30B, more preferably a part 32 of one of the straight tubular elements 30B". According to a preferred embodiment, the mounting portion 31-33 comprises at least one part 31 of the second shelf 30C, at least the part 32 of the first shelf 30B and preferably at least one retaining element 33, which allow keeping the first and second shelves 30B, 30C together. According to an embodiment, the retaining element 33 is basically "C"-shaped and is preferably made of plastic material. In particular, the element 33 is an elastic element designed to prevent or at least reduce the vibrations of the top box 10 while the motorcycle 1 is moving.

Thereby, the shape coupling achieved between the fixing portion 41A and the mounting portion 31-33 allows obtaining a stable connection of the top box 10 on the luggage carrier 30. In particular, such a connection creates a locking system which avoids translation and rotation movements of the top box with respect to the luggage carrier surface, in addition to ensuring that it is fastened transversely, i.e. from the bottom towards the top.

According to an embodiment, the fixing assembly 40 comprises a fixing member 41, a fixed portion 44 integral with the bottom 13 of the top box 10 and connection elements 61,62. In particular, the fixing member 41 is rotatably hinged to the bottom 13 by means of the connection elements 61, 62. In the example, the connection elements 61, 62 comprise, but are not limited to, a connection pin 61 fixed to the bottom 13 of the top box 10 which crosses a connection hole 62 provided in the fixing member 41. According to an embodiment, the fixing portion 41A is obtained in the fixing member 41.

According to an embodiment, the fixing portion 41A is interposed between the connection elements 61, 62 and the locking means 51, 52 when the fixing assembly 40 takes the fixing configuration. According to an embodiment, the fixing portion 41A defines a fixing recess 42 and the bottom 13 comprises a mounting recess 43 which faces the fixing recess 41 when the fixing assembly 40 takes the fixing configuration. In particular, according to a convenient embodiment, the mounting recess 43 is wider than the fixing recess 42. This makes it easier to position the top box 10 on the luggage carrier 30 during the installation of the top box 10 compared to the case, described below, in which the shaped fixing portion 41A is provided in the bottom 13 of the top box 10.

As mentioned above, according to an alternative embodiment (not shown in the figures), the shaped fixing portion 41A could be provided in the bottom 13 of the top box instead of in the fixing member 41. In other words, the fixed portion 44 of the bottom 13, which in the example shown defines the mounting recess 43, could be shaped so as to achieve, when the fixing assembly 40 takes the fixing configuration, a shape coupling with the mounting portion 31-33 of the luggage carrier 30. In another alternative embodiment, the shaped fixing portion 41A adapted to achieve a shape coupling the mounting portion 31-33 could be defined in both the bottom 13 of the top box 10 and the fixing portion 41.

Figure 2:
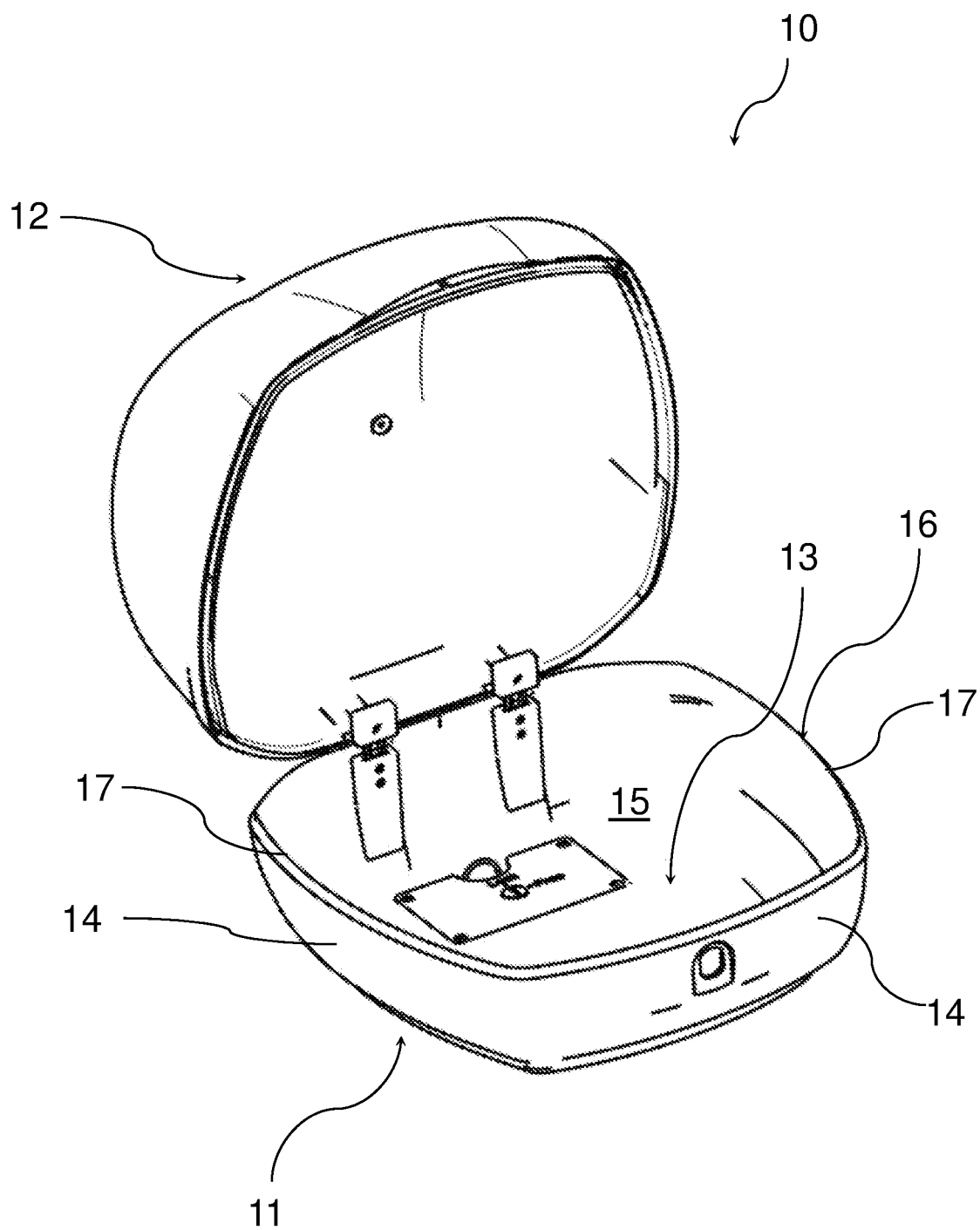
FIG. 2 is a perspective view from the top of the top box in FIG. 1 in which the top box is open.

With reference to FIGS. 2-3, according to an embodiment, the top box 10 comprises a container body 11, 12, including a base 11 and a cover 12 operatively connected, preferably hinged, to the base 11. The base 11 comprises the aforementioned base 13 and a side wall 14 connected perimetrically to the base 13. The bottom 13 and the side wall 14 at least partially define a storage compartment 15. The side wall 14 has an edge 16 which defines an access opening 17 to the storage compartment 15 and which is opposite to the bottom 13. According to an embodiment, the locking means 51, 52 comprise a first locking element 51 associated with the bottom 13 of the top box 10. The first locking element 51 has an actuation portion 51A, 51B accessible from the storage compartment. Additionally, the locking means 51,52 comprise a second conjugate locking element 52 which is associated with the fixing member 41 and it is adapted to couple with the first locking element 51 when the fixing assembly 40 takes the fixing configuration. Therefore, it is easier to lock the top box quickly.

According to an embodiment, the first locking element 51 comprises a locking screw 51 which projects partially from the bottom 13 of the top box 10 and the second the conjugate locking element 52 comprises a threaded portion 52 associated with the fixing member 41. According to an embodiment, the actuation portion 51A, 51B of the first locking element 51 is located in a housing cavity 71 obtained in the thickness of the bottom 13 of the top box 10. Advantageously, therefore, the first locking element 51 substantially does not occupy useful space inside the storage compartment 15 and further prevents the objects housed in the top box 10, such as a crash helmet, from being scratched when they come into contact with the locking element 51. According to an advantageous embodiment, the actuation portion 51A, 51B comprises an actuation element 51B configured to facilitate the actuation operation of the first locking element 51. By way of non-limiting example, if the clamping element 51 comprises a locking screw 51, the actuation element 51B may comprise a plate 51B connected to the head 51A of the screw 51 which may be gripped with the fingers of a hand so as to facilitate the screwing and unscrewing of the screw 51 without the need to use tools, such as a screwdriver or other tool.

According to a particularly advantageous embodiment, a safety system 80 is provided to keep the fixing assembly 40 in the fixing configuration even in the event of a malfunction of the locking means 51, 52. In particular, the safety system 80 comprises a safety member 80 associated with the bottom 13 of the top box 10 which is adapted to take an engagement configuration (FIG. 4) and a disengagement configuration (FIG. 5). In the engagement configuration, the safety device 80 engages the fixing device 41 in order to keep the fixing device 40 in the fixing configuration. In the disengagement configuration, the safety device 80 is disengaged from the fixing member 41 so as to allow the fixing device 40 to take the release configuration. Thereby, the safety organ 80 cooperates with the fixing assembly 40 to ensure a stable connection of the top box even if the clamping assembly 40 breaks or is subject to a malfunction.

According with an embodiment, the safety device 80 comprises a control portion 81 which can be accessed from the storage compartment 15. According to an advantageous embodiment, as shown for example in FIG. 4, the control portion 81 is recessed in the thickness of the bottom 13 of the top box 10. Thereby, the safety organ 80 does not occupy any useful space inside the storage compartment 15, thus keeping the capacity thereof unchanged. According to an embodiment, the safety device 80 comprises a pin 80 provided with a locking element 82, preferably a locking tab 82, which in the fixing configuration of the fixing assembly 40 is adapted to engage a portion of the end of the fixing device 41 which is located near the connection elements 61,62. According to an embodiment, the safety device 80 is a quarter-turn locking element.

According to an embodiment, the fixing assembly 40 and the locking means 51, 52 under operating conditions are adapted to inhibit the translation of the top box along a first and a second direction D1, D2 which are mutually orthogonal. According to a preferred embodiment, direction D1 corresponds to the direction of travel of the motorcycle 1 and direction D2 is a vertical direction. In particular, the fixing assembly 40 comprises abutment elements 91, 92 protruding from the bottom 13 of the top box 10 to inhibit a translation of the top box 10 along a third direction orthogonal to the aforesaid first and second directions D1, D2. Preferably the abutment elements 91, 92 also facilitate the positioning of the top box 10 with respect to the luggage carrier 30 during the assembly of the top box 10. Thus, when the top box is placed on the luggage carrier, the abutment elements 91, 92 work as a reference thus guiding the top box into the correct position. This makes it easier to lock the device quickly. According to an embodiment, the abutment elements 91, 92 are adapted to be positioned laterally against the frame 30B' of the first shelf 30B.

According to an embodiment, the top box 10 comprises a hooking element 93 protruding from the bottom 13 of the top box 10 to inhibit a rotation of the top box 10 about the aforesaid third direction, i.e. a direction orthogonal to the plane of the luggage carrier, and to inhibit jolts and vibrations of the top box 10 while driving the vehicle 1. According to an embodiment, the hooking element 93 is coupled to the frame 30B' of the first shelf 30B when the top box 10 is mounted to the luggage carrier 30.

On the basis of the explanation above, it is thus possible to understand how a ridable saddle vehicle of the type described above allows achieving the purposes indicated above with reference to the prior art.

Indeed, by virtue of the provision of a fixing assembly on the bottom of the top box, it is possible to fix the top box to the luggage carrier easily and rapidly, thus avoiding the mounting luggage carrier described above from being mounted in advance with reference to the known art.

Furthermore, by virtue of the fact that the fixing assembly has a shaped portion so as to achieve a shape coupling with a mounting portion of the luggage carrier, this allows fixing the top box to the luggage carrier in a particularly stable and secure manner.

Notwithstanding the principle of the disclosure, embodiments and details may be widely varied with respect to that described and illustrated herein exclusively by way of non-limiting example without departing from the scope of the disclosure as defined in the appended claims.

The invention claimed is:

1. Top box for a ridable saddle vehicle, comprising:
 a container body including a base and a cover operatively connected to the base, the base comprising a bottom and a side wall joined perimetrically to the bottom, the bottom and the side wall at least partially define a storage compartment, the side wall having an edge which defines an access opening to the storage compartment opposite the bottom; and
 a fixing assembly arranged on said bottom and configured to fix the top box to a luggage carrier which comprises at least one mounting portion;
 wherein said fixing assembly is configured to assume a release configuration, in which it allows to couple/decouple the top box to/from said luggage carrier, and a fixing configuration, in which it allows to fix the top box to said luggage carrier;
 wherein said fixing assembly comprises:
 a fixing member having at least one fixing portion shaped in such a way as to provide, when the fixing assembly assumes said fixing configuration, a shape coupling with said mounting portion, wherein said fixing member is rotatably hinged to said bottom through connection elements;
 locking means suitable for locking the fixing assembly in the fixing configuration;
 wherein the locking means comprise a first locking element associated to the bottom of the top box and having an actuation portion accessible from the storage compartment, and a second conjugate locking element which is associated with the fixing member and it is suitable for coupling with the first locking element when the fixing assembly assumes the fixing configuration.

2. Top box according to claim 1, wherein the fixing assembly comprises a fixed portion integral with the bottom of said top box.

3. Top box according to claim 1, wherein said fixing portion is interposed between the connection elements and the locking means when the fixing assembly assumes the fixing configuration.

4. Top box according to claim 1, wherein said actuation portion is arranged in a housing cavity formed in the thickness of the bottom of the top box.

5. Top box according to claim 1, wherein the first locking element comprises a locking screw which projects partially from the bottom of the top box and the second the conjugate locking element comprises a threaded portion associated with the fixing member.

6. Top box according to claim 1, wherein a safety system is provided for maintaining the fixing assembly in the fixing configuration even in the event of a malfunction of the locking means, wherein the safety system comprises a safety member associated with the bottom of the top box which is suitable for assuming an engagement configuration, in which it engages the fixing member so as to maintain the fixing assembly in the fixing configuration, and a disengagement configuration, in which it is disengaged from the fixing member in such a way as to allow the fixing assembly to assume the release configuration.

7. Top box according to claim 6, wherein said safety member comprises a control portion accessible from the storage compartment wherein said control portion is embedded in a thickness of the bottom of the top box.

8. Top box according to claim 1, wherein the fixing assembly and the locking means in the operative conditions are suitable for inhibiting the translation of the top box along a first and a second direction orthogonal to each other, wherein said fixing assembly comprises abutment elements projecting from the bottom of the top box to inhibit a translation of the box along a third direction orthogonal to said first and second directions.

9. Top box according to claim 8, comprising a hooking element projecting from the bottom of the box to inhibit a rotation of the top box around said third direction and to inhibit jolts and vibrations of the top box while driving said vehicle.

10. Group of parts comprising a luggage carrier and a top box as defined in claim 1, said luggage carrier having a tubular truss frame.

11. Assembly comprising a ridable saddle vehicle and a group of parts as defined in claim 10 fixed to said vehicle.

* * * * *